(12) United States Patent
Linkewitsch et al.

(10) Patent No.: US 7,564,875 B2
(45) Date of Patent: Jul. 21, 2009

(54) TECHNIQUES TO MAP AND DE-MAP SIGNALS

(75) Inventors: Niklas Linkewitsch, Evessen (DE); Michael Kauschke, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 986 days.

(21) Appl. No.: 10/706,356

(22) Filed: Nov. 11, 2003

(65) Prior Publication Data

US 2005/0117585 A1 Jun. 2, 2005

(51) Int. Cl.
*H04J 3/07* (2006.01)
(52) U.S. Cl. ...................... 370/506; 370/509
(58) Field of Classification Search ............... 370/503, 370/505, 506, 507, 509
See application file for complete search history.

(56) References Cited

U.S. PATENT DOCUMENTS

| | | | | |
|---|---|---|---|---|
| 4,002,844 A * | 1/1977 | Doussoux | ............... | 370/506 |
| 4,302,839 A * | 11/1981 | Mueller | ............... | 370/506 |
| 4,542,500 A * | 9/1985 | Jean-Claude | ............... | 370/506 |
| 5,265,090 A * | 11/1993 | Guinand et al. | ............... | 370/377 |
| 5,457,717 A * | 10/1995 | Bellamy | ............... | 375/372 |
| 6,744,787 B1 * | 6/2004 | Schatz et al. | ............... | 370/506 |
| 7,200,157 B1 * | 4/2007 | Hessler et al. | ............... | 370/509 |
| 2002/0186719 A1 * | 12/2002 | Subrahmanyan et al. | .... | 370/506 |
| 2003/0161350 A1 | 8/2003 | Wolf | | |
| 2004/0042500 A1 * | 3/2004 | Christiansen | ............... | 370/509 |
| 2005/0036518 A1 * | 2/2005 | Link et al. | ............... | 370/503 |
| 2005/0074032 A1 * | 4/2005 | Surek | ............... | 370/503 |

FOREIGN PATENT DOCUMENTS

EP 1 043 856 A2 10/2000
WO WO 02/054821 A2 7/2002

OTHER PUBLICATIONS

European Patent Office, International Search Report and Written Opinion for International Application No. PCT/US2004/035922, 13 pages, Mar. 14, 2005.
International Telecommunication Union, Telecommunication Standardization Sector (ITU-T), "Series G: Transmission Systems and Media, Digital Systems and Networks; Digital Terminal Equipments—General; Interface for the Optical Transport Network (OTN)", Document No. G.709 (revised), 133 pages, Oct. 2001.

* cited by examiner

*Primary Examiner*—Hassan Kizou
*Assistant Examiner*—Bo Hui A Zhu
(74) *Attorney, Agent, or Firm*—Caven & Aghevli LLC

(57) ABSTRACT

Briefly, a system that maps SONET/SDH data to an OTN frame using justification commands. Briefly, a system that de-maps an OTN frame into SONET/SDH data using justification commands.

22 Claims, 6 Drawing Sheets

TECHNIQUES TO MAP AND DE-MAP SIGNALS

FIELD

The subject matter disclosed herein generally relates to techniques to map and de-map signals.

DESCRIPTION OF RELATED ART

ITU-T G.709/Y.1331 Interfaces for the Optical Transport Network (OTN) (February 2001) describes a convention for conversion of signals between optical transport network (OTN) and either Synchronous Optical Network (SONET) or Synchronous Digital Hierarchy (SDH) standards. G.709 describes synchronous and asynchronous modes of transmitting SONET/SDH data using an OTN transmission frame. In synchronous mode, the rate of data transfer is a fixed rational multiple of the client signal rate, whereas, in asynchronous mode, the rate of data transfer of the SONET signal is time varying. Accordingly, establishing the correct clock rate is integral to properly mapping and de-mapping signals between OTN and SONET/SDH. G.709 describes the use of justification control and justification commands to establish proper clock rates.

According to G.709, an OTN frame may include three justification control (JC) bytes, one negative justification opportunity (NJO) command, and one positive justification opportunity (PJO) command. According to G.709, three justification related operations may be derived: (1) zero justification, (2) positive justification (which corresponds to a single missing client byte per OTN frame), or (3) negative justification (which corresponds to an extra client byte per OTN frame). For negative justification, PJO and NJO may both include real data. For positive justification, PJO and NJO may both include dummy data. For zero justification, PJO may include real data whereas the NJO may include dummy data.

In the case of asynchronous mode operation, clock signals used to map and de-map signals between OTN and SONET/SDH are modified according to justification control and justification commands. For example, FIG. 1 depicts an example prior art device that regenerates received data based on justification control and justification commands. The de-wrapper transfers client data to the elastic store during burst-like write operations. Data is read out of the elastic store with the nominal synchronous client rate modified by justification commands in the OTN signal that convey the client data signal to the de-wrapper. The filling limits device meters the difference between the number of client bytes received from the OTN layer and the associated number of client bytes clocked out with the client clock. Once the difference crosses an lower/upper boundary, the filling limits device provides UP/DOWN signals to add/remove phase from a clock signal used to time data read-outs from the elastic store. One drawback is that the phase gain of the UP/DOWN signal depends on the synchronous ratio between the client signal and the OTN layer.

BRIEF DESCRIPTION OF THE DRAWINGS

Note that use of the same reference numbers in different figures indicates the same or like elements.

DETAILED DESCRIPTION

Figure 1:
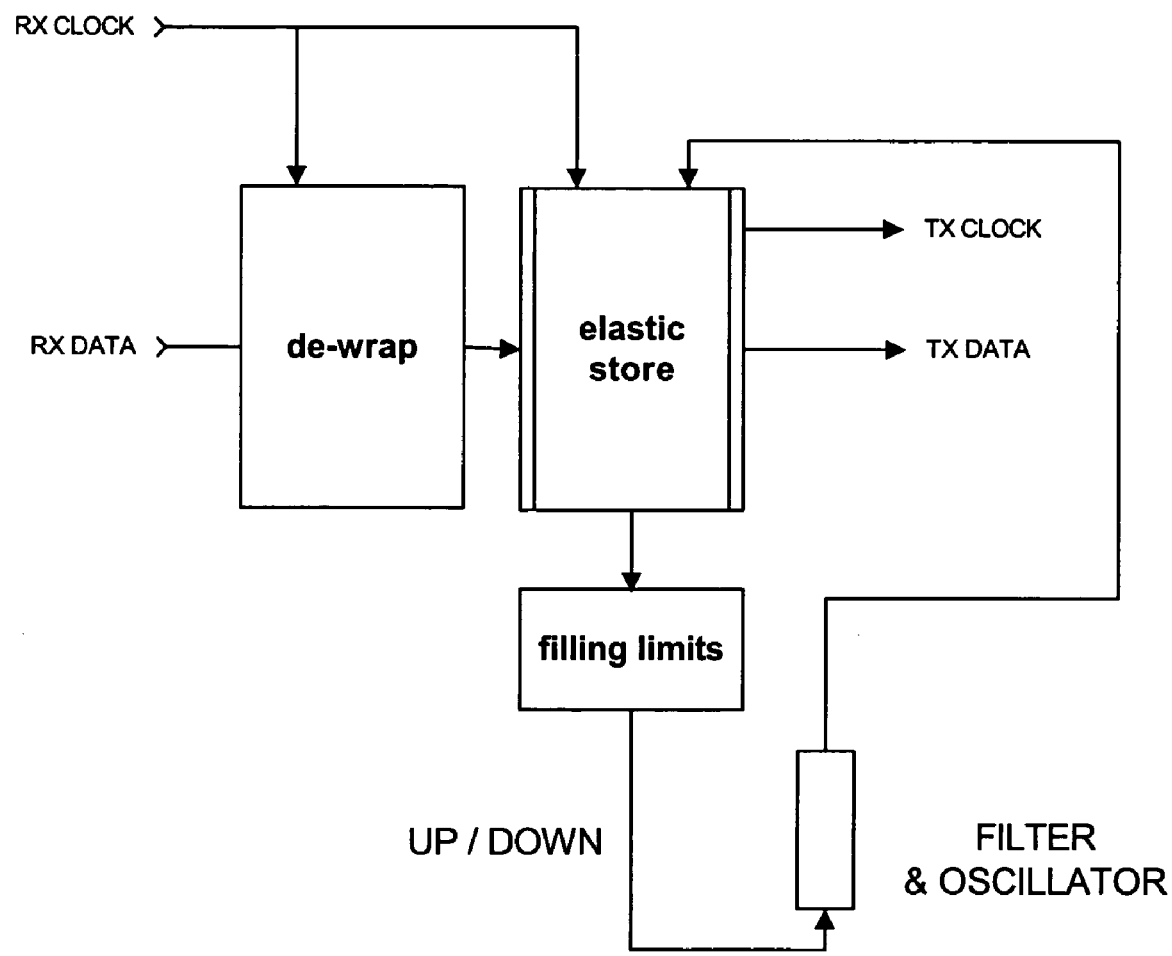
FIG. 1 depicts an example prior art device to regenerate data based on justification commands.
Figure 2A:
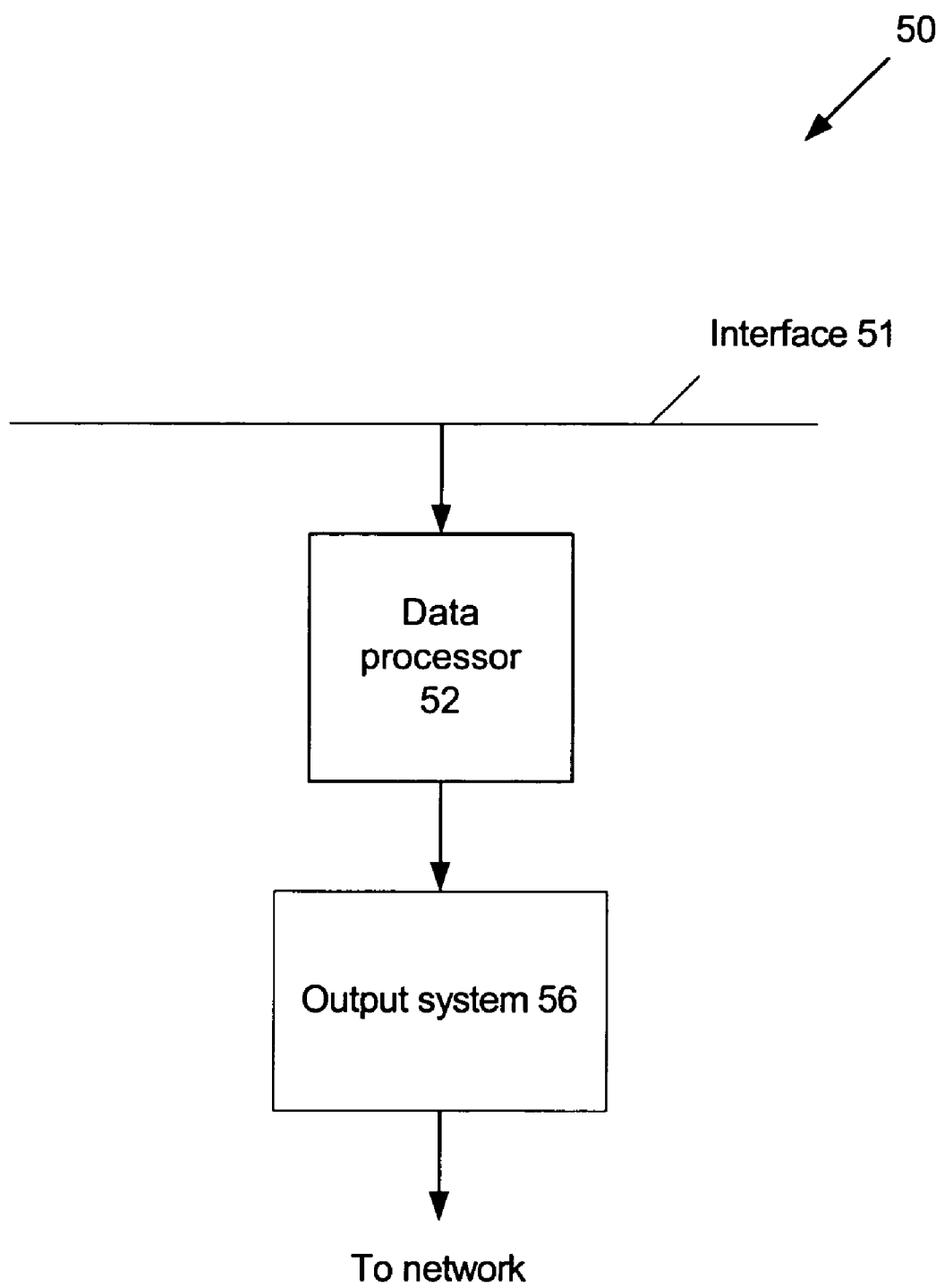
FIG. 2A depicts a transmitter system that may use some embodiments of the present invention.

FIG. 2A depicts a transmitter system 50 that may use some embodiments of the present invention. Transmitter system 50 may include interface 51, data processor 52, and output system 56. Interface 51 may provide intercommunication between data processor 52 and other devices such as memory devices (not depicted), packet processor (not depicted), microprocessor (not depicted) and/or a switch fabric (not depicted). Interface 51 may comply with one or more of the following standards: Ten Gigabit Attachment Unit Interface (XAUI) (described in IEEE 802.3, IEEE 802.3ae, and related standards), Serial Peripheral Interface (SPI), I²C, universal serial bus (USB), IEEE 1394, Gigabit Media Independent Interface (GMII) (described in IEEE 802.3, IEEE 802.3ae, and related standards), Peripheral Component Interconnect (PCI), ten bit interface (TBI), and/or a vendor specific multi-source agreement (MSA) protocol.

Data processor 52 may perform media access control (MAC) encoding in compliance for example with Ethernet (described for example in IEEE 802.3 and related standards); framing and wrapping in compliance for example with ITU-T G.709; forward error correction (FEC) encoding in compliance for example with ITU-T G.975; and/or other encodings. For example, data processor 52 may utilize some embodiments of the present invention. Output system 56 may prepare signals for transmission to a network. For example, output system 56 may remove jitter from signals provided by data processor 52 and/or convert electrical signals into stable optical signals for transmission to an optical network.

Figure 2B:
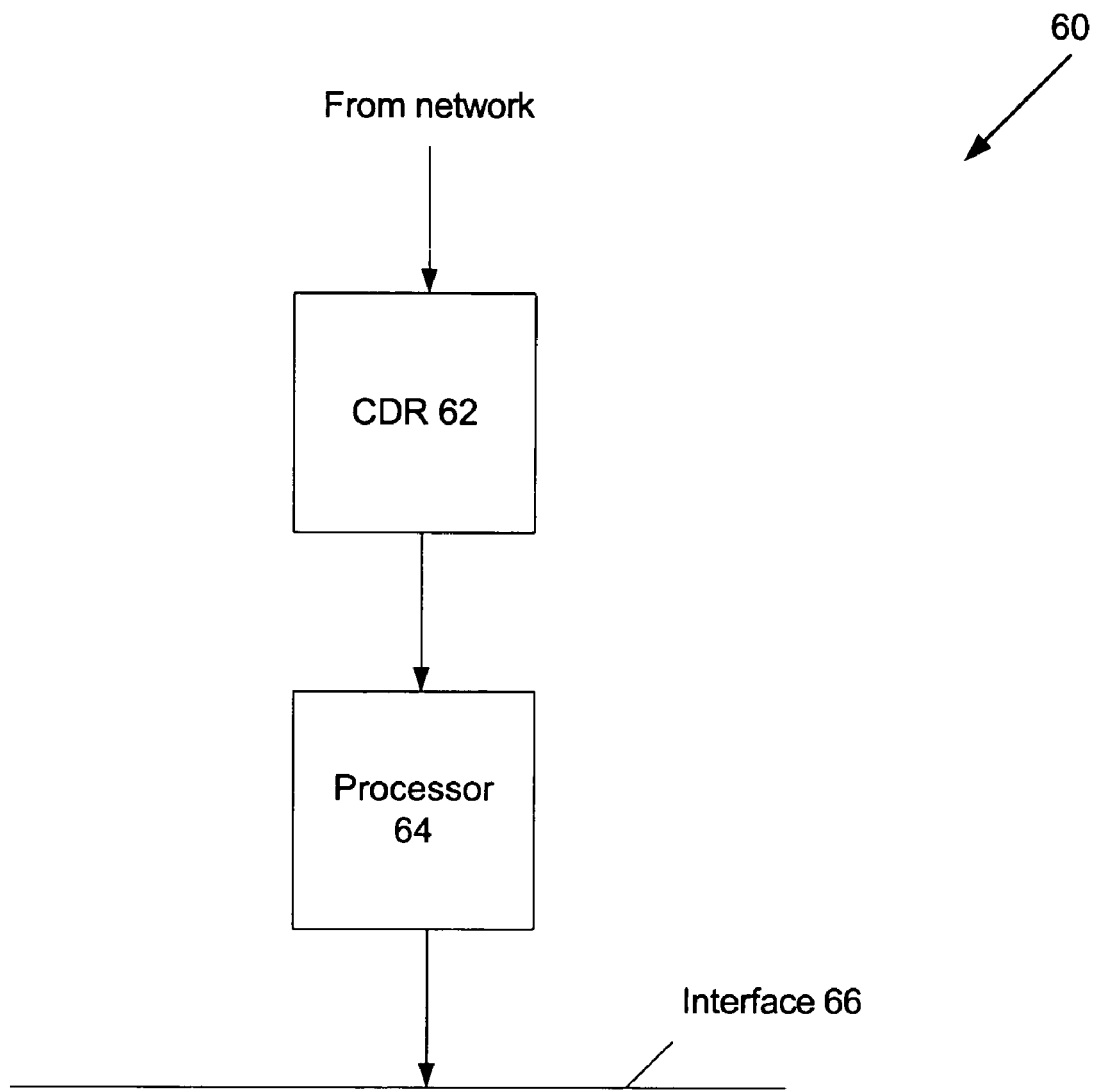
FIG. 2B depicts a receiver system that may use some embodiments of the present invention.

FIG. 2B depicts a receiver system 60 that may use some embodiments of the present invention. Receiver system 60 may include a clock and data recovery unit ("CDR") 62, processor 64, and interface 66. Clock and data recovery unit ("CDR") 62 may remove signal jitter from signals received from a network. Processor 64 may perform at least layer two processing such as media access control (MAC) processing in compliance for example with Ethernet; layer 1 functions as optical transport network (OTN) de-framing and de-wrapping in compliance for example with ITU-T G.709; forward error correction (FEC) processing in compliance for example with ITU-T G.975; and/or other decodings. For example, processor 64 may utilize some embodiments of the present invention. Interface 66 may provide intercommunication in a similar manner to that of interface 51.

Figure 3:
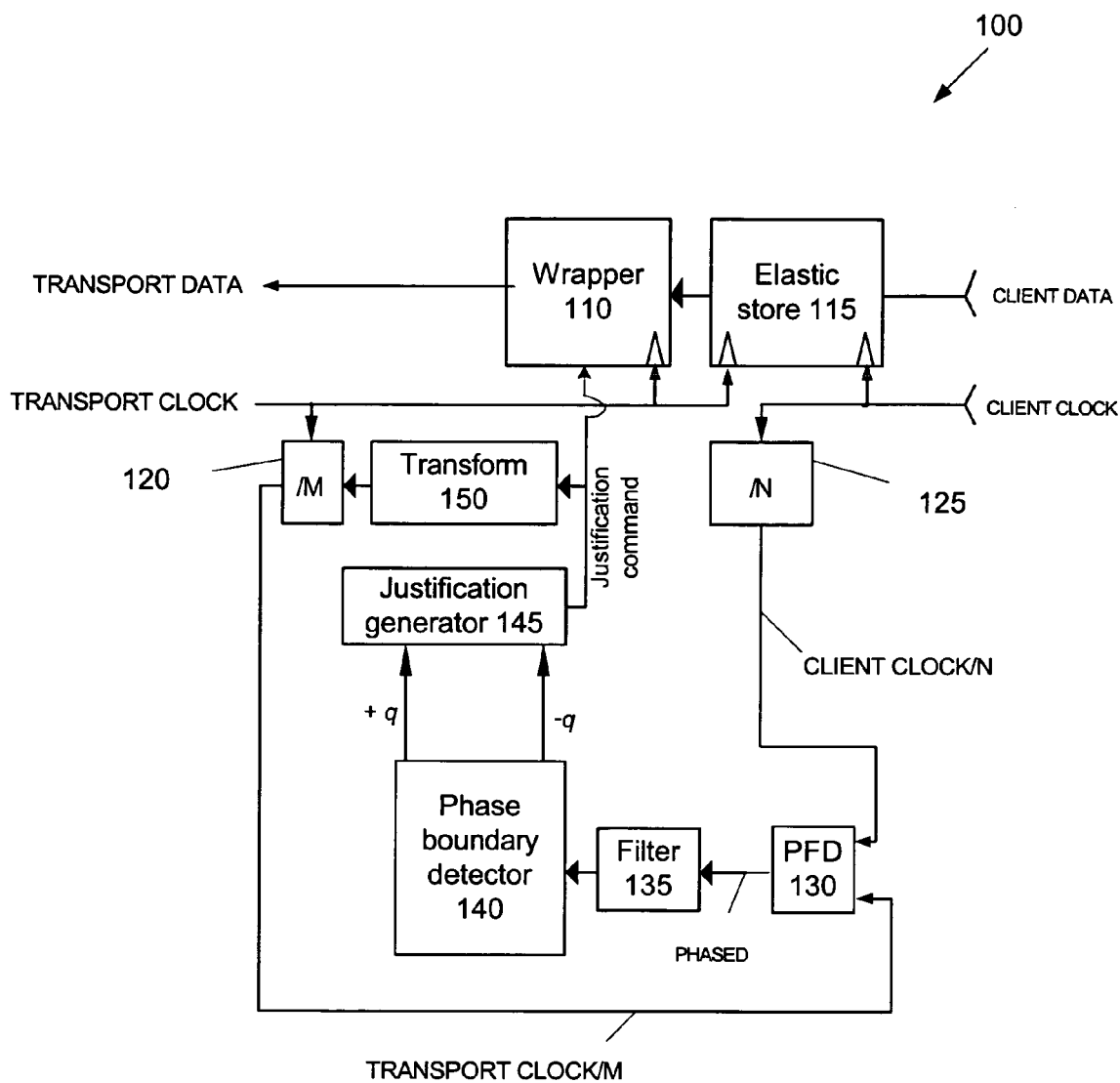
FIG. 3 depicts an implementation of a mapper, in accordance with an embodiment of the present invention.

In accordance with an embodiment of the present invention, FIG. 3 depicts an implementation of mapper 100. One embodiment of mapper 100 may include wrapper 110, elastic store 115, dividers 120 and 125, phase and frequency detector (PFD) 130, filter 135, phase boundary detector 140, justification generator 145, and transform device 150. Mapper 100 may map bits from a client signal like SONET/SDH to an OTN frame implementing a dynamic rate adaptation based on provided stuff opportunities.

Elastic store 115 may receive an input signal CLIENT DATA. Signal CLIENT DATA may include data to be encapsulated for transmission. Elastic store 115 may store signal CLIENT DATA according to clock signal CLIENT CLOCK. Elastic store 115 may provide stored client data from stored signal CLIENT DATA according to the frequency of clock signal TRANSPORT CLOCK. Disregarding stuff opportunities, clock signals TRANSPORT CLOCK and CLIENT CLOCK may have a nominal fractional ratio of M/N. In one example, the nominal clock frequency ratio of M/N is 85/79, although other ratios may be used.

Divider 120 may provide a clock signal TRANSPORT CLOCK/M that has a frequency of 1/M times the frequency of clock signal TRANSPORT CLOCK. Divider 125 may provide a clock signal CLIENT CLOCK/N that has a frequency of 1/N times the frequency of clock signal CLIENT CLOCK. In one implementation, variables "M" and "N" are 85 and 79, respectively, so that the frequencies of clock signals TRANSPORT CLOCK/M and CLIENT CLOCK/N are approximately equal.

PFD 130 may compare the phases of signals TRANSPORT CLOCK/M and CLIENT CLOCK/N. PFD 130 may output a voltage signal (shown as PHASED) indicating a magnitude of phase difference between signals TRANSPORT CLOCK/M and CLIENT CLOCK/N. Filter 135 may be optionally used to transfer a limited frequency spectrum of the signal PHASED. Filter 135 may be implemented as a low pass filter having a pass band of approximately 0.1 to 10 MHz, although other frequency ranges may be used.

Phase boundary detector 140 may convert a transferred portion of signal PHASED into information that can be used to generate justification values. For example, phase boundary detector 140 may generate a zero, +q (positive), or −q (negative) justification value based on the transferred portion of signal PHASED. Positive or negative values may be generated based on deviations from the MIN frequency ratio between clock signals TRANSPORT CLOCK and the CLIENT CLOCK. In one implementation, phase boundary detector 140 may compare a transferred portion of signal PHASED against threshold values U1 and U2, where U1>U2, where U1−U2 represents a value corresponding to a phase difference of 2*q. For example, U1 and U2 may be near the middle of the range of PHASED. If a transferred portion of signal PHASED is greater than U1, then phase boundary detector 140 may generate a +q (positive) phase value. If a transferred portion of signal PHASED is less than U2, then phase boundary detector 140 may generate a −q phase value. If a transferred portion of signal PHASED is greater than or equal to U2 but less than or equal to U1, then phase boundary detector 140 may generate a zero phase value (not depicted). Phase boundary detector 140 may generate a phase value for every OTN frame.

Based on detected phase deviation, justification generator 145 may generate justification commands. For example, a +q value may correspond to a sequence of positive justification commands representing a phase difference of +q whereas a −q value may correspond to a representation of a sequence of negative justification commands. A zero phase value may correspond to a zero justification command.

Transform 150 and wrapper 110 may receive justification commands. Based on positive or negative justification commands, transform 150 may modify the phase of the clock signal TRANSPORT CLOCK/M to compensate for the applied justification and thus closing the control loop. In at least a case the phase of dividers 120 and 125 may only be modified in time quanta defined by a transport clock period, transform 150 may modify the phase of the clock signal TRANSPORT CLOCK/M in accordance with the process described with respect to FIG. 5.

To generate signal TRANSPORT DATA, wrapper 110 may use data provided in signal CLIENT DATA and periodically insert transport related overhead of fixed size (including but not limited to justification control and justification commands) and stuff opportunities in compliance for example with ITU-T G.709. Wrapper 110 may provide signal TRANSPORT DATA timed according to the clock signal TRANSPORT CLOCK. Signal TRANSPORT DATA may be transmitted to a network.

Figure 4:
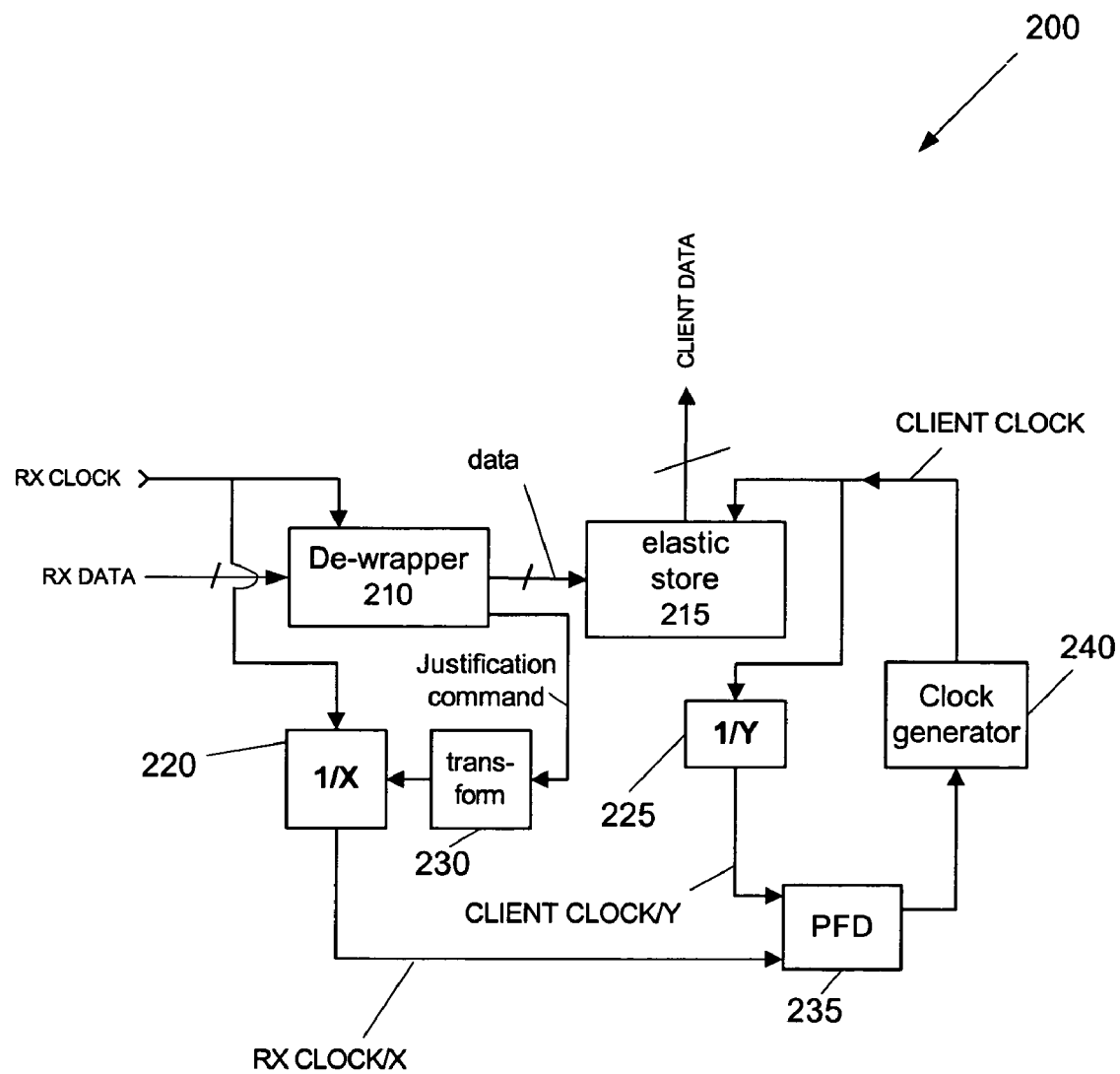
FIG. 4 depicts an implementation of a de-mapper, in accordance with an embodiment of the present invention.

FIG. 4 depicts an implementation of a de-mapper 200, in accordance with an embodiment of the present invention. One implementation of de-mapper 200 may include de-wrapper 210, elastic store 215, dividers 220 and 225, transform device 230, phase and frequency detector (PFD) 235, and clock generator 240. De-mapper 200 may map bits from an OTN frame to a SONET/SDH frame based on at least justification commands.

De-wrapper 210 may receive signal RX DATA timed according to clock signal RX CLOCK. Signal RX DATA may include data payload and overhead portions. An overhead portion may include a transport layer management portion. Based on the transport layer, de-wrapper 210 may determine justification commands in accordance with ITU-T G.709. Signal RX DATA may be transmitted by a transmitter that utilizes a wrapper that provides justification commands in accordance with ITU-T G.709. For example, signal RX DATA may be a version of signal TRANSPORT DATA provided by mapper 100, although other mappers may be used.

De-wrapper 210 may transfer data from signal RX DATA to the elastic store 215 timed to clock signal RX CLOCK. Elastic store 215 may output data from signal RX DATA timed according to signal CLIENT CLOCK (such output data signal is shown as signal CLIENT DATA). In one implementation, disregarding stuff operations, clock signals RX CLOCK and CLIENT CLOCK may have a nominal, fractional frequency relationship of X/Y. In one example, the ratio of X/Y may be 85/79, although other ratios may be used. Signal CLIENT DATA may be retrieved from signal RX DATA by periodically discarding the transport related overhead of fixed size and by executing received justification operations.

Divider 220 may provide a clock signal RX CLOCK/X that has a frequency of 1/X times the frequency of clock signal RX CLOCK. In one implementation, the variable X may be 85. Based on positive and negative justification commands, transform device 230 may modify the phase of signal RX CLOCK/X. For example, in one implementation, to modify the phase of signal RX CLOCK/X, transform device 230 may control the operation of the divider 220 substantially in accordance with the process described with respect to FIG. 5.

Clock generator 240 may provide a clock signal CLIENT CLOCK. Divider 225 may provide a clock signal CLIENT CLOCK/Y that has a frequency of 1/Y times the frequency of clock signal CLIENT CLOCK. In one implementation, the variable Y may be 79.

PFD 235 may compare the phases of signals RX CLOCK/X and CLIENT CLOCK/Y. The frequencies and the phase of clock signals CLIENT CLOCK/Y and RX CLOCK/X may be approximately equal in steady state. PFD 235 may output a voltage signal indicating a magnitude of phase difference between signals RX CLOCK/X and CLIENT CLOCK/Y. Clock generator 240 may adjust the phase of signal CLIENT CLOCK based on the phase comparison from PFD 235.

Figure 5:
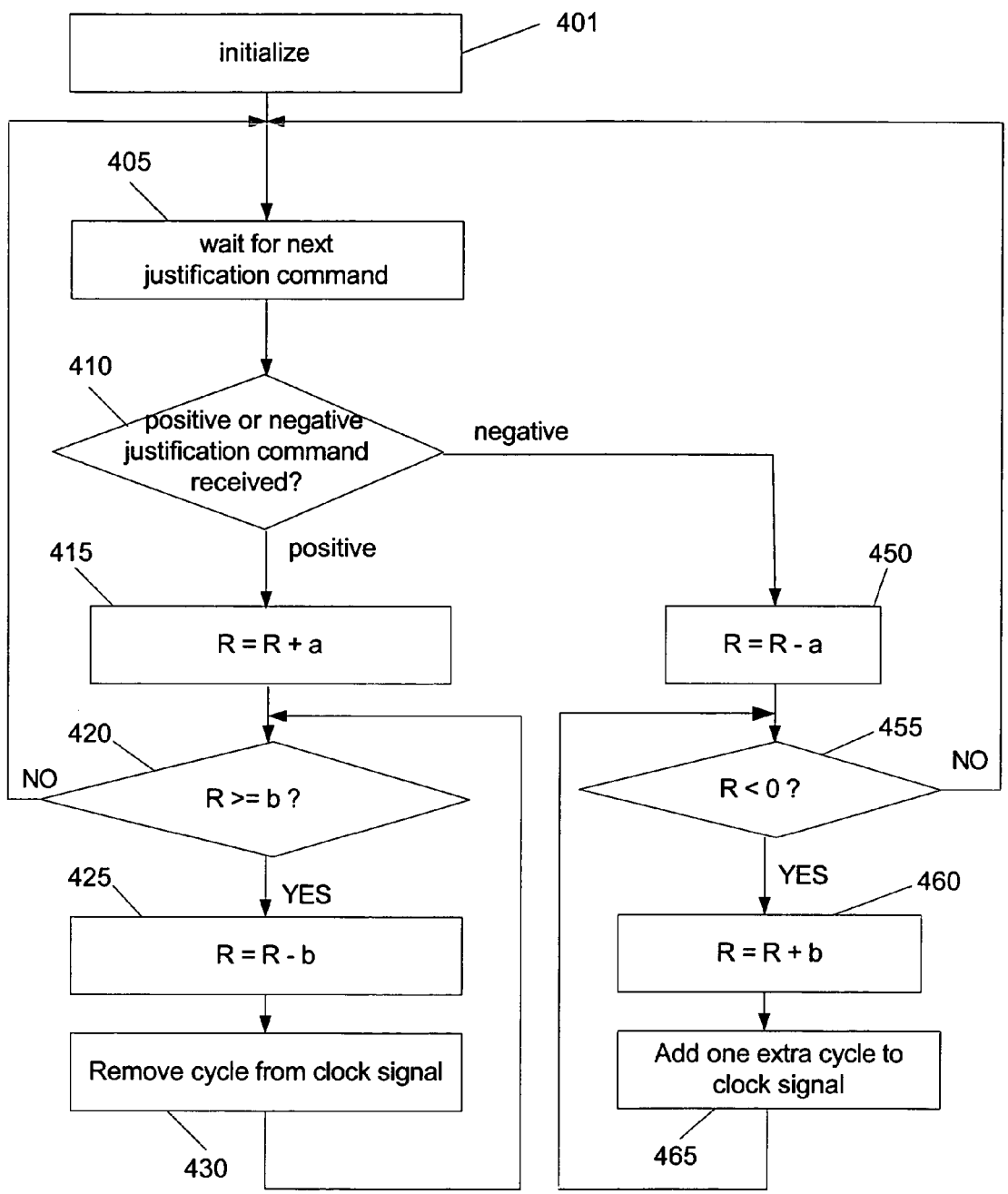
FIG. 5 depicts a process that may be performed to determine an amount to adjust a phase of a clock signal based on positive and negative justification commands, in accordance with an embodiment of the present invention.

FIG. 5 depicts a process that may be performed to determine an amount to adjust a phase of a clock signal (e.g., TRANSPORT CLOCK/M, in the case of mapper 100, or RX CLOCK/X, in the case of de-mapper 200) based on positive and negative justification commands, in accordance with an embodiment of the present invention. The clock signal modified by the process of FIG. 5 may be used to map bits from an SONET/SDH frame to an OTN frame based on justification commands or to map bits from an OTN frame to a SONET/SDH frame based on justification commands.

In action 401, the process initializes for operation. For example, action 401 may include initializing a phase account variable, R, to zero. Variable R may be used, in part, to determine whether to add or subtract phase to or from a clock signal (e.g., TRANSPORT CLOCK/M in the case of mapper 100, or RX CLOCK/X in the case of de-mapper 200). Variable R may be used to account for bits associated with a previous bit grouping for which a phase adjustment was not made or to account for bits associated with a next bit grouping for which a phase adjustment was made. Variable R can be used to determine the phase account in time units when multiplied by the appropriate constant. For example, the term "Tc*R/a" may correspond to the accounted-for phase in terms of time, where "Tc" may represent a time for one client byte to be written into elastic store 115 or elastic store 215 and where variable "a" is described below.

In action 405, the process awaits a justification command. In action 410, the process may include determining whether a positive or negative justification command was received. If a positive justification command was received, then action 415 may follow action 410. If a negative justification command was received, then action 450 may follow action 410.

In action 415, the process may update the phase account variable R to account for the phase impact of a positive justification command. Action 415 may include adding a variable "a" to the variable R. Adding variable "a" may correspond to the phase shift of one justification byte. In terms of time, adding variable "a" may result in adding a time unit of Tc to the term "Tc*R/a".

In action 420, the process may determine whether the number of accounted-for bits is enough to allow a phase adaptation. Action 420 may include determining whether the variable R is greater than or equal to a variable "b". The variables "a" and "b" may be chosen to match the nominal clock relationship M/N (in the case of mapper 100) or X/Y (in the case of de-mapper 200). In one implementation, variables "a" and "b" may be respective eighty-five (85) and seventy-nine (79). Note that in such implementation, seventy-nine (79) justification commands will initiate an average of eighty-five (85) phase adjustments. Other values of variables "a" and "b" may be used. If the variable R is greater or equal to variable "b", then action 425 may follow action 420. If the variable R is not greater than and not equal to variable "b", then action 405 may follow action 420.

In action 425, phase account variable "R" may be updated according to the amount of clock signal phase shift adjustment in action 430. Action 425 may include decreasing variable R by an amount equal to variable "b". In action 430, the process may instruct a skip of one cycle of the clock signal. For example, in the case of mapper 100, divider 120 may skip one cycle of clock signal TRANSPORT CLOCK/M whereas in the case of de-mapper 200, divider 220 may skip one cycle of clock signal RX CLOCK/X. Action 420 may follow action 430.

Referring to action 450, the process may update the phase account variable "R" to account for the phase impact of a negative justification command. For example, action 450 may include decreasing the variable R by an amount equal to the variable "a", which may correspond to the phase shift of one client byte (e.g., a client byte read into either elastic store 115 or elastic store 215). In terms of time, subtracting variable "a" may result in subtracting a time unit of Tc from the term "Tc*R/a".

In action 455, the process may determine whether the number of accounted-for bits is low enough to allow a phase adaptation. Action 455 may include determining whether the variable R is negative. If the variable R is negative, then action 460 may follow action 455. If the variable R is not negative, then action 405 may follow action 455.

In action 460, the phase account variable "R" may be updated according to the amount of clock signal phase shift adjustment in action 465. Action 460 may include increasing the variable R by an amount equal to the variable "b". In action 465, the process may add one cycle to the clock signal. For example, in the case of mapper 100, divider 120 may add one cycle to clock signal TRANSPORT CLOCK/M whereas in the case of de-mapper 200, divider 220 may add one cycle to clock signal RX CLOCK/X. Action 455 may follow action 465.

Modifications

The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus to provide data based in part on a justification command, the apparatus comprising:
    processor logic to selectively provide a justification command and data from an input signal;
    a clock source to provide a first clock signal, wherein the clock source selectively modifies a phase of the first clock signal in response to the justification command; and
    an elastic store device to selectively transfer the data based in part on the first clock signal, wherein the clock source comprises first, second, and third clock sources to respectively provide the first, a second, and a third clock signals; a transform device to modify the phase of the clock signal in response to the justification command, to update a phase account to account for a phase impact of the justification command, and to update the phase account according to an amount of clock signal phase shift adjustment; and a phase comparator to modify the phase of the second clock signal based on a phase comparison of the first and third clock signals, wherein the processor logic is to selectively provide the justification command in response to a relative value of the phase comparison and a threshold value, wherein the clock source is to selectively maintain a ratio of the first clock signal to the third clock signal as approximately one in response to the justification command.

2. The apparatus of claim of 1, wherein the clock source is to selectively add a cycle to the first clock signal in response to a negative justification command and a phase account value to allow a phase adaptation.

3. The apparatus of claim 1, wherein the clock source is to selectively remove a cycle from the first clock signal in response to a positive justification command and a phase account value to allow a phase adaptation.

4. The apparatus of claim 1, wherein the processor logic is to perform forward error correction decoding in accordance with ITU-T G.975.

5. The apparatus of claim 1, wherein the processor logic is to identify the justification command in compliance with ITU-T G.709.

6. The apparatus of claim 1, wherein the input signal comprises an OTN frame.

7. The apparatus of claim 1, wherein the transform device is to selectively update a phase account to account for a phase impact of a negative justification command in response to a negative justification command.

8. The apparatus of claim 7, wherein the transform device is to selectively update the phase account according to an amount of clock signal phase shift adjustment in response to a first value of the phase account to allow a phase adaptation.

9. The apparatus of claim 8, wherein the transform device is to selectively wait for a next justification command in response to a second phase account value to allow a phase adaptation.

10. The apparatus of claim 1, wherein the transform device is to selectively wait for a next justification command.

11. A method to provide data based in part on a justification command comprising:
  selectively extracting a justification command and data from an input signal;
  selectively modifying a phase of a first clock signal in response to the justification command, wherein the justification command is provided based on a phase comparison between second and third clock signals and in response to a relative value of the phase comparison and a threshold value;
  selectively transferring the data based in part on the first clock signal; selectively modifying the phase of the second clock signal in response to the justification command;
  selectively combing the justification command with the data based on the first clock signal;
  updating a phase account to account for a phase impact of the justification command; and
  selectively maintaining a ratio of the first clock signal to the third clock signal as approximately one in response to the justification command.

12. The method of claim 11, wherein the modifying comprises selectively adding a cycle to the first clock signal in response to a negative justification command and a phase account value being low enough to allow a phase adaptation.

13. The method of claim 11, wherein the modifying comprises selectively removing a cycle from the first clock signal in response to a positive justification command and a phase account value being enough to allow a phase adapatation.

14. The method of claim 11, wherein the input signal comprises an OTN frame.

15. A system to provide a justification command comprising:
  an interface;
  an elastic store device communicatively coupled with the interface and to selectively transfer data in response to a first clock signal;
  a clock source to provide the first clock signal;
  a justification source to selectively provide a justification command based on a phase comparison between second and third clock signals, wherein the justification source is to selectively provide the justification command in response to a relative value of the phase comparison and a threshold value;
  a transform device to selectively modify the phase of the second clock signal in response to the justification command; and
  a wrapper device to selectively combine the justification command with the data based on the first clock signal and to provide the combination; and
  a data processor communicatively coupled with the interface and the wrapper device, wherein the interface comprises an XAUI interface, wherein the clock source is to selectively maintain a ratio of the first clock signal to the third clock signal as approximately one in response to the justification command.

16. The system of claim 15, wherein the interface comprises an IEEE 1394 interface.

17. The system of claim 15, wherein the interface comprises a PCI interface.

18. The system of claim 15, wherein the data processor is to perform optical transport network framing in compliance with ITU-T G.709.

19. The system of claim 15, wherein the data processor is to perform forward error correction processing in compliance with ITU-T G.975.

20. The system of claim 15, further comprising a switch fabric coupled to the interface.

21. The system of claim 15, further comprising a packet processor coupled to the interface.

22. The system of claim 15, further comprising a memory device coupled to the interface.

* * * * *